(12) United States Patent
Krzanowski et al.

(10) Patent No.: US 8,386,600 B2
(45) Date of Patent: Feb. 26, 2013

(54) PERFORMANCE MONITORING OF E-TREE SERVICE

(75) Inventors: Roman M. Krzanowski, White Plains, NY (US); Frank M. Shannon, Arnold, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 688 days.

(21) Appl. No.: 12/639,221

(22) Filed: Dec. 16, 2009

(65) Prior Publication Data

US 2011/0145394 A1 Jun. 16, 2011

(51) Int. Cl.
 *G06F 15/173* (2006.01)
(52) U.S. Cl. ........................................ 709/224; 709/245
(58) Field of Classification Search .................. 709/224, 709/245
See application file for complete search history.

(56) References Cited

U.S. PATENT DOCUMENTS

| | | | |
|---|---|---|---|
| 7,779,415 B2 * | 8/2010 | Bisdikian et al. | 718/105 |
| 7,969,997 B1 * | 6/2011 | Noh et al. | 370/408 |
| 2003/0088671 A1 * | 5/2003 | Klinker et al. | 709/225 |
| 2009/0034413 A1 * | 2/2009 | Sajassi et al. | 370/228 |
| 2009/0122718 A1 * | 5/2009 | Klessig et al. | 370/254 |
| 2009/0271467 A1 * | 10/2009 | Boers et al. | 709/201 |
| 2010/0111086 A1 * | 5/2010 | Tremblay et al. | 370/390 |
| 2010/0146324 A1 * | 6/2010 | Sajassi et al. | 714/2 |
| 2012/0051362 A1 * | 3/2012 | Rabie et al. | 370/392 |
| 2012/0201122 A1 * | 8/2012 | Mohan | 370/217 |

FOREIGN PATENT DOCUMENTS

EP 2 129 049 A1 * 12/2009

* cited by examiner

*Primary Examiner* — Patrice Winder

(57) ABSTRACT

A root node associated with an Ethernet-Tree (E-Tree) service sends, over a rooted-multipoint Ethernet virtual connection (EVC), a performance monitoring (PM) packet, where the PM packet includes a unique identifier for the root node and a time sent by the root node. The root node receives, from leaf nodes and a root point associated with the E-Tree service, PM response packets, where each PM response packet includes a unique identifier for the responding leaf node/root point and a time received by the responding leaf node/root point. The root node extracts, from each of the PM response packets, the unique identifier and the time received, and stores performance measurements based on the extracted data, where the performance measurements are associated with the respective leaf nodes/root point.

20 Claims, 6 Drawing Sheets

| NODE ID | FRAME DELAY (msec) | FRAME DELAY VARIATION | FRAME LOSS |
|---|---|---|---|
| Leaf #1 | 200 | 7.5% | 0.2% |
| Leaf #2 | ##### | ##### | ##### |
| Leaf #N | ##### | ##### | ##### |
| Switch with Root Point | ##### | ##### | ##### |

FIG. 4

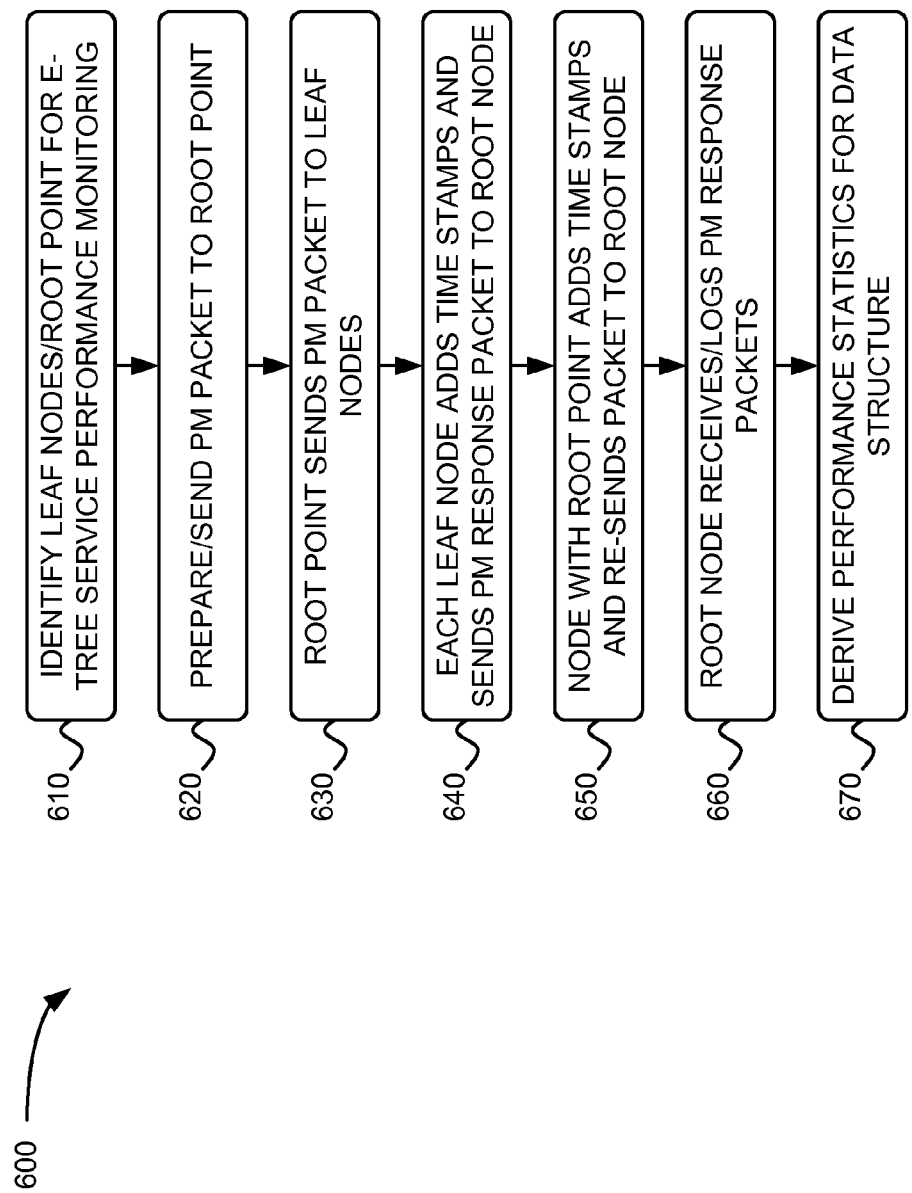

PERFORMANCE MONITORING OF E-TREE SERVICE

BACKGROUND INFORMATION

The Metro Ethernet Forum (MEF) develops technical specifications and implementation agreements to promote interoperability and deployment of Carrier Ethernet worldwide. MEF Technical Specification 6.1 defines a particular Ethernet service type called Ethernet-Tree (or E-Tree), which is based on a Rooted-Multipoint Ethernet Virtual Connection (EVC). In a simple form, an E-Tree Service type may provide a single root for multiple leaf user network interfaces (UNIs) or nodes. Each leaf UNI can exchange data with only the root UNI. E-Tree service may be useful for Internet access or video-over-IP applications, such as multicast/broadcast packet video.

Typical performance monitoring of E-Tree services provides data that is not particular to an individual leaf UNI. Such monitoring may not allow for accurate evaluation of the performance on each path (e.g., a root to leaf UNI path). Furthermore, such monitoring makes troubleshooting problems with the E-Tree service more difficult, since the performance of any particular leaf UNI may not be discernable in the overall performance results.

BRIEF DESCRIPTION OF THE DRAWINGS

FIG. 4 depicts portions of an exemplary data structure that may be used by a node of FIG. 1;

FIG. 6 provides a flow chart of an exemplary process for monitoring performance of E-Tree services over a metro Ethernet network according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Aspects described herein may provide systems and/or methods that allow for performance monitoring of individual paths in an E-Tree service. Particularly, the systems and/or methods may enable monitoring of the performance of individual paths between a root node and each leaf node and of the path between the root node and a root (bridging) point. In one implementation, the root node may include a data structure (e.g., a table) to manage the performance measurements of the individual paths between the root node and each leaf node and between the root node and the root point. Performance monitoring packets originating from the root node may be received at the root point and, subsequently, at the leaf nodes. The root point and the leaf nodes may provide response packets with time stamps and node identifiers that identify the originating leaf node or root point. Data from the response packets may be extracted and used to derive performance statistics associated with each path in the E-Tree service.

The term "packet," as used herein, may refer to a packet, a datagram, a frame, or a cell; a fragment of a packet, a fragment of a datagram, a fragment of a frame, a fragment of a cell; or another type, arrangement, or packaging of data.

Figure 1:
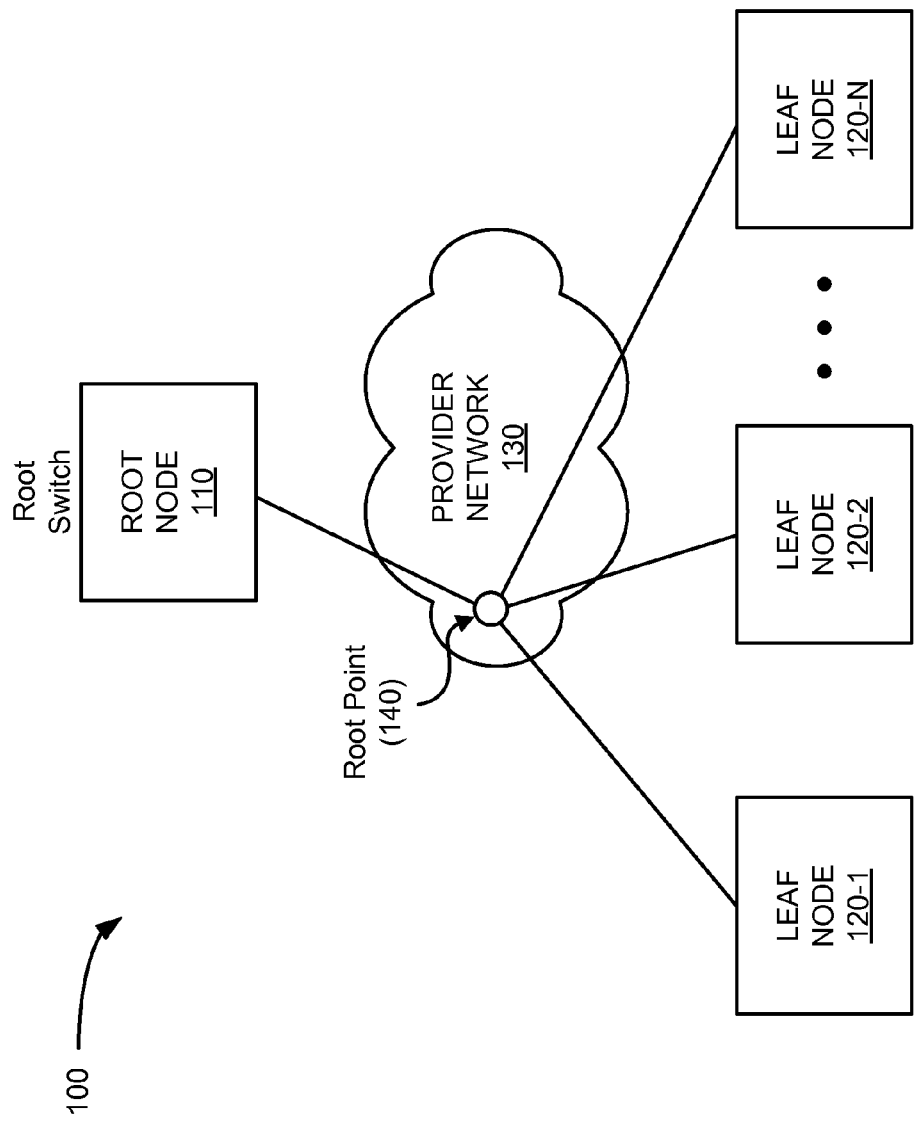
FIG. 1 is a diagram of an exemplary network in which systems and/or methods described herein may be implemented.

FIG. 1 is a diagram of an exemplary network 100 in which systems and/or methods described herein may be implemented. As illustrated, network 100 may include a root node 110, and multiple leaf nodes 120-1, 120-2, . . . , 120-N (referred to herein collectively as "leaf nodes 120," or generically as "leaf node 120") interconnected by a network 130 that includes at least one root point 140. Components of network 100 may interconnect via wired and/or wireless connections.

For simplicity, one root node 110, three leaf nodes 120, one provider network 130, and one root point 140 have been illustrated in FIG. 1. In practice, there may be more root nodes 110, leaf nodes 120, provider networks 130, and/or root points 140. Also, in some instances, one or more of the components of network 100 may perform one or more functions described as being performed by another one or more of the components of network 100. Although FIG. 1 illustrates exemplary network 100, in other implementations, network 100 may include differently arranged components than those depicted in FIG. 1. Additionally, or alternatively, the connections between devices may be direct or indirect.

Root node 110 and leaf nodes 120 may be similarly configured devices that may serve as a root or leaf in a MEF E-Tree service. Root node 110 and leaf nodes 120 may include one or more data transfer devices, such as a switch, a gateway, a router, a firewall, a network interface card (NIC), a hub, a bridge, a proxy server, or some other type of device that processes and/or transfers data. For example, root node 110 and leaf nodes 120 may include routers that provide an entry to and/or an exit from provider network 130. Root node 110 and leaf nodes 120 may include measurement logic that measures latency, packet loss, jitter, and/or other parameters associated with routing data via provider network 130.

Root node 110 and leaf nodes 120 may transmit and receive data via any number of protocols, such as Ethernet, Frame Relay, asynchronous transfer mode (ATM), time division multiplexing (TDM), Internet protocol (IP), etc. In some implementations, root node 110 and/or leaf nodes 120 may be located at a demarcation point, such as in an Ethernet demarcation (ED) device, a network interconnection device (NID), or a managed media converter. In another implementation, root node 110 and/or leaf nodes 120 may be a provider edge (PE) device that routes data received from various devices, such as customer devices (not shown) provided outside of provider network 130, using multi-protocol label switching (MPLS). In this case, root node 110 and/or leaf nodes 120 may set up a label switching path (LSP) via provider network 130 in which data forwarding decisions are made using an MPLS label, included with a data packet, to identify a next hop to which to forward the data. Root node 110 and leaf nodes 120 may alternatively be referred to as user network interfaces (UNIs).

Provider network 130 may represent a network used to route customer data traffic to/from various devices in network 100. Provider network 130 may include devices, systems, and/or protocols that provide switching and/or routing of packets. For example, provider network may include wide area network (WAN), such as the Internet, a private WAN, or a combination of the Internet and a private WAN. Provider network 130 may include a number of devices and links that may be used to connect root node 110 and leaf nodes 120. In an exemplary implementation, provider network 130 may include a number of devices used to route data using MPLS. For example, provider network 130 may include a ME network.

Root point 140 may include a bridging point within a rooted-multipoint Ethernet virtual connection (EVC) of a ME network (e.g., provider network 130). Root point 140 may be located within a node that may include one or more data transfer devices, such as a switch, a gateway, a router, a firewall, a NIC, a hub, a bridge, a proxy server, or some other type of device that processes and/or transfers data. Root point 140 may function to transmit data between other network devices provided within provider network 130. As used herein, root point 140 may be broadly construed to refer to a root (bridging) point or a node that includes a location of root point 140.

In implementations described herein, root node 110 and leaf nodes 120 may connect via EVCs. In the direction from root node 110 to the leaf nodes 120, root node 110 may send traffic (e.g., a packet) to root point 140 over an EVC. Root point 140 may replicate the packet to each of leaf node 120-1, leaf node 120-2, . . . , leaf node 120-N, and may send the packet over a point-to-point EVC for each of leaf nodes 120. In the direction from leaf nodes 120 to root node 110, each of leaf nodes 120 may send traffic to root point 140. Root point 140 may not replicate packets from leaf nodes 120, and may deliver the packets to root node 110 as generated by each leaf node 120 (with possible changes to the encapsulation).

Current performance monitoring methods for EVCs operate on point-to-point bases. That is, a test packet is sent from a point A to a point B and forwarded back from the point B to the point A. Performance parameters, such as frame delay (FD), frame loss (FL), and/or frame delay variation (FDV) for the A to B and B to A transmission may be derived from such exchanges. Using the current performance monitoring methods, in the case of E-Tree service, root node 110 would receive a number of response packets equal to the number (N) of leaf nodes 120 without knowledge from which leaf node 120 a particular packet is coming. Such an arrangement does not allow for accurate evaluation of the performance on each path (e.g., from root node 110 to each leaf node 120) and of the E-Tree service, in general. Also, with the current monitoring method it may be difficult to troubleshoot problems, as the performance of a specific leaf would be hidden (e.g., not explicit) in the overall performance monitoring results.

Implementations described herein allow for performance monitoring of the individual paths between root node 110 and each of leaf nodes 120-1, 120-2, . . . 120-N, and for performance monitoring of the path between root node 110 and root point 140. As described further herein, root node 110 may send a performance monitoring (PM) packet, with a time sent stamp, to root point 140. Root point 140 may send copies of the PM packet to each of leaf nodes 120-1, 120-2, . . . , 120-N. Each leaf node 120 may resend the PM packet back to root node 110, and may include a leaf node ID, a receive time stamp, and a send time stamp in the PM packet. Also, the node in which root point 140 is located may send back to root node 110 the PM packet with a node ID, a receive time stamp, and a send time stamp. Root node 110 may employ a data structure to track measurements for each leaf node 120 and root point 140 based on receipt of the PM packets.

Figure 2:
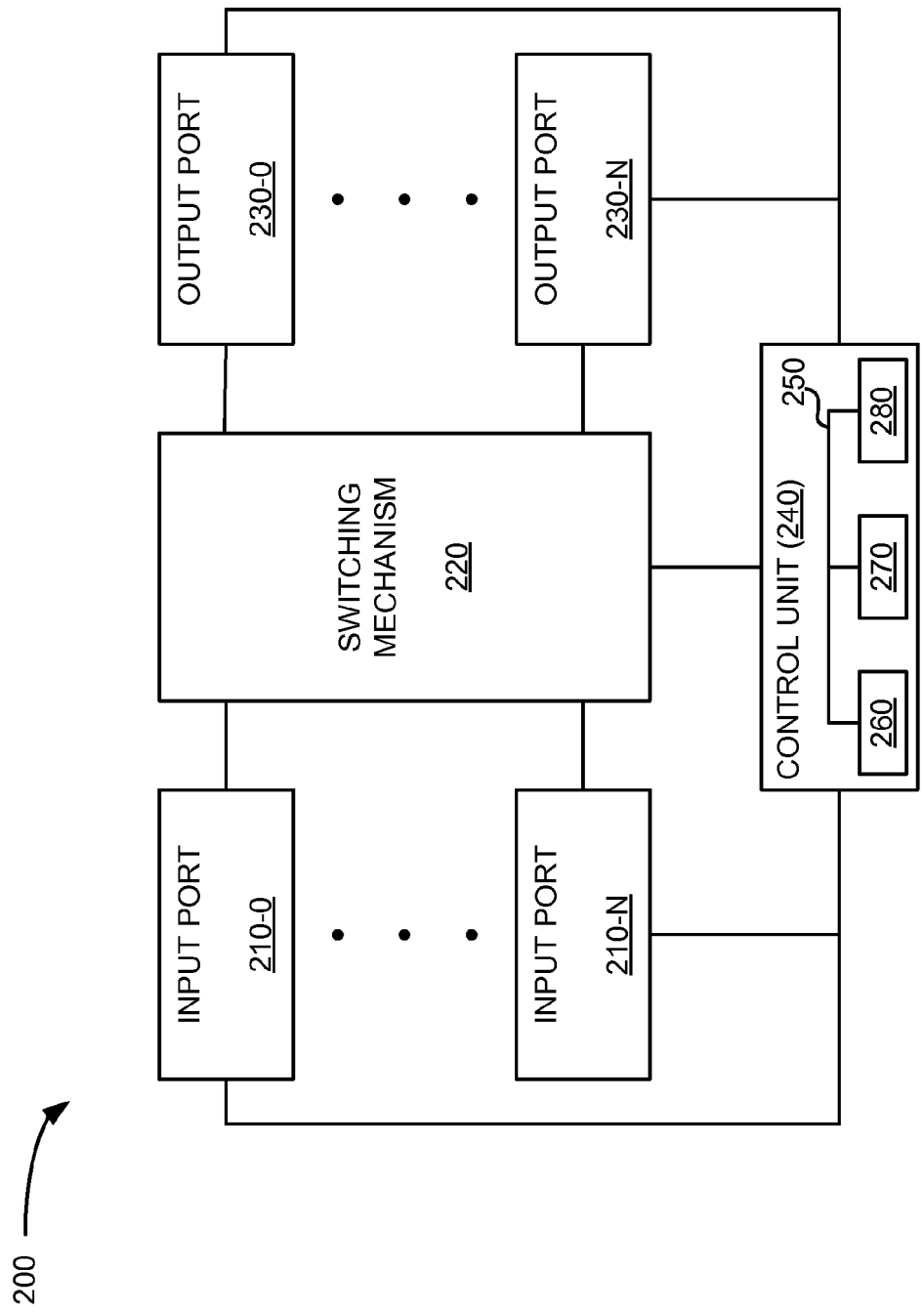
FIG. 2 is a diagram of exemplary components of a device that may correspond to a node depicted in network device of FIG. 1.

FIG. 2 is an exemplary diagram of a device 200 that may correspond to root node 110, one of leaf nodes 120, and/or root point 140 of FIG. 1. Device 200 may include input ports 210, a switching mechanism 220, output ports 230, and a control unit 240. Input ports 210 may be the point of attachment for a physical link (not shown) and may be the point of entry for incoming packets. Switching mechanism 220 may interconnect input ports 210 with output ports 230. Output ports 230 may store packets and may schedule packets for service on an output link (not shown). Control unit 240 may use routing protocols and one or more forwarding tables.

Input ports 210 may carry out data link layer encapsulation and decapsulation. Input ports 210 may look up a destination address of an incoming packet in a forwarding table to determine its destination port (i.e., route lookup). In other implementations, input ports 210 may be ports that send (e.g., may be an exit point) and/or receive (e.g., may be an entry point) packets.

Switching mechanism 220 may be implemented using many different techniques. For example, switching mechanism 220 may include busses, crossbars, and/or shared memories. The simplest switching mechanism 220 may be a bus that links input ports 210 and output ports 230. A crossbar may provide multiple simultaneous data paths through switching mechanism 220. In a shared-memory switching mechanism 220, incoming packets may be stored in a shared memory and pointers to packets may be switched.

Output ports 230 may store packets before they are transmitted on an output link (not shown). Output ports 230 may support data link layer encapsulation and decapsulation, and/or a variety of higher-level protocols. In other implementations, output ports 230 may send (e.g., may be an exit point) and/or receive (e.g., may be an entry point) packets.

Control unit 240 may interconnect with input ports 210, switching mechanism 220, and output ports 230. Control unit 240 may compute a forwarding table, implement routing protocols, and/or run software to configure and manage network device 110. Control unit 240 may handle any packet whose destination address may not be found in the forwarding table.

In one implementation, control unit 240 may include a bus 250 that may include a path that permits communication among a processor 260, a memory 270, and a communication interface 280. Processor 260 may include a microprocessor or processing logic that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

As described herein, device 200 may perform certain operations in response to processor 260 executing software instructions contained in a computer-readable medium, such as memory 270. A computer-readable medium may be defined as a physical or logical memory device. A logical memory device may include memory space within a single physical memory device or spread across multiple physical memory devices. The software instructions may be read into memory 270 from another computer-readable medium or from another device via communication interface 280. The software instructions contained in memory 270 may cause processor 260 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. Alternatively, or additionally, one or more components of device 200 may perform one or more other tasks described as being performed by one or more other components of device 200.

Figure 3:
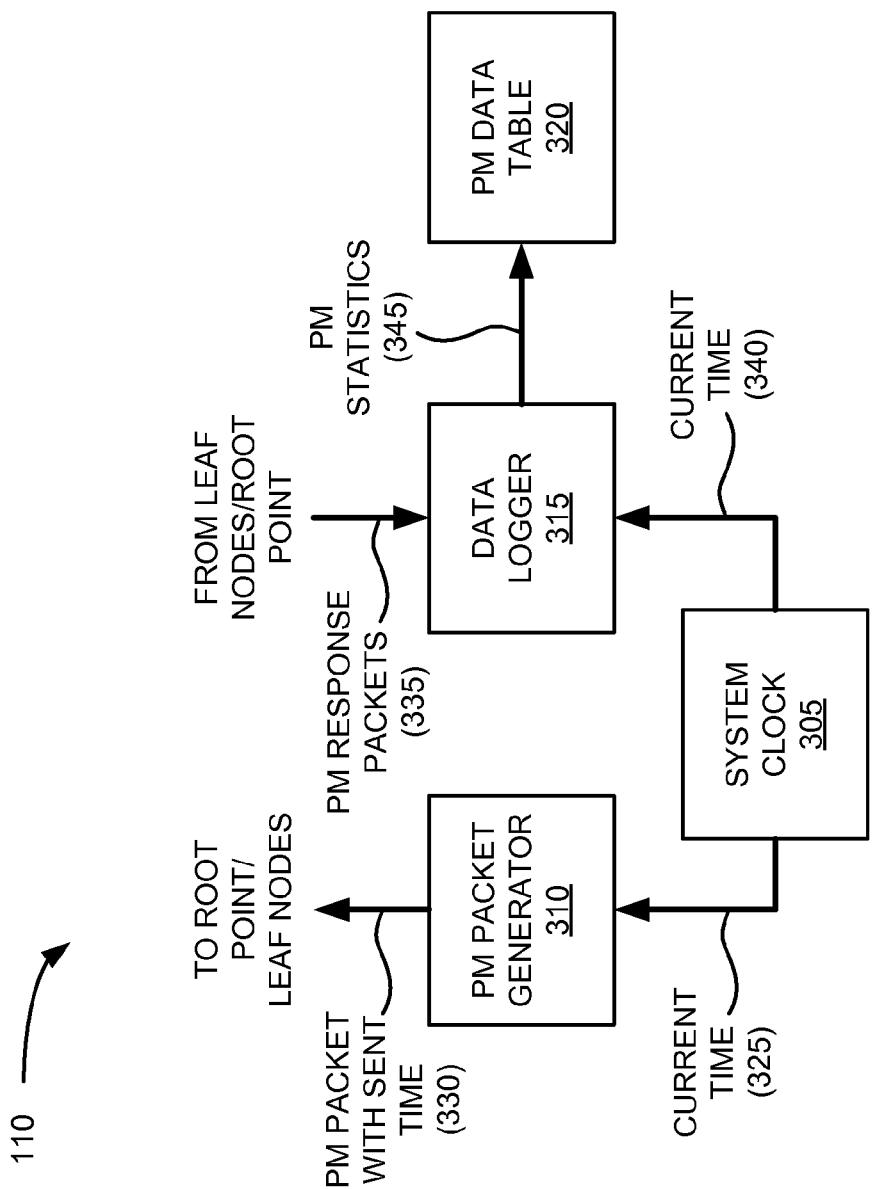
FIG. 3 is a diagram of exemplary functional components of a root node depicted in FIG. 1.

FIG. 3 is a diagram of exemplary functional components of root node 110. In one implementation, the functions described in connection with FIG. 3 may be performed by one or more components of device 200 (FIG. 2). As shown in FIG. 3, root node 110 may include a system clock 305, a performance monitoring (PM) packet generator 310, a data logger 315, and a PM data table 320.

System clock 305 may include hardware or a combination of hardware and software that may identify a time, such as a time associated with a coordinated universal time (UTC) clock, and may synchronize the time with other devices (e.g., leaf nodes 120, root point 140) and/or functional components. For example, system clock 305 may utilize a network clock synchronization protocol (e.g., a Network Time Protocol (NTP) or a Digital Time Synchronization Protocol (DTSS)) that can read a server clock (not shown) and transmit the time associated with the server clock to one or more clients to adjust each client clock as required. System clock 305 may provide a first current time 325 to PM packet generator 310, a second (e.g., later) current time 340 to data logger 315, and/or another current time to other functional components (not shown).

PM packet generator 310 may include hardware or a combination of hardware and software that may generate a PM packet for monitoring the performance of individual paths between root node 110 and leaf nodes 120, and between root node 110 and root point 140. For example, PM packet generator 310 may identify a particular E-Tree service to monitor and generate a PM packet 330 to send to root point 140 (and, subsequently, each leaf node 120). PM packet 330 may include a unique identifier for root node 110 and a sent time (e.g., based on current time 325 received from system clock 305). In one implementation, the structure of PM packet 330 (e.g., a data portion, excluding layer 2 encapsulation) may be as follows:

[Root node ID] [TsX], where "Root node ID" may be a unique identifier (e.g., an IP address, an alphanumeric identifier, or another identifier) for root node 110, and where "TsX" may be a sent time for PM packet 330. PM packet 330 can be inserted into, or combined with, the payload portion of any performance monitoring protocol.

Data logger 315 may include hardware or a combination of hardware and software that may receive, extract, and store performance monitoring information from leaf nodes 120 and root point 140. For example, data logger 315 may receive one or more PM response packets 335 (e.g., responses to PM packet 330) from each of leaf nodes 120 (e.g., via root point 140) and one or more responding packets from root point 140. Data logger 315 may extract time stamp information and node identifiers from each packet, apply a received time (e.g., based on a current time 340 received from system clock 305), and process the time information and node identifiers to derive PM statistics 345 associated with the root node (e.g., root node 110). Thus, PM response packets 335 may allow for derivation of PM statistics for each root node-to-leaf node path. The derived statistics may include, but are not limited to: one-way or two-way frame delay, two-way frame loss, and one-way or two-way frame delay variation. The same statistic may also be derived for the path from the root node 110 to the node with the location of root point 140.

PM data table 320 may include one or more storage devices that may store information received by and/or provided by root node 110. For example, PM data table 320 may receive, from data logger 315, PM statistics 345 for each leaf node 120 and root point 140 associated with root node 110. Alternatively, or additionally, PM data table 320 may include raw data that data logger 315 extracts from PM response packets 335, such as time stamp data and packet sequence numbers associated with each leaf node and/or root point 140.

Although FIG. 3 shows exemplary functional components of root node 110, in other implementations, root node 110 may contain fewer, different, differently arranged, or additional functional components than depicted in FIG. 3. Alternatively, or additionally, one or more functional components of root node 110 may perform one or more other tasks described as being performed by one or more other functional components of root node 110.

FIG. 4 depicts portions of an exemplary data structure 400 that may correspond to portions of PM data table 320. Data structure 400 may be stored in, or accessible by, root node 110. Data structure 400 may be used by root node 110 directly or by other network devices in communication with root node 110 to, for example, manage performance measurements. Data structure 400 may be implemented in a single database, in multiple databases, or as one or more tables.

As illustrated in FIG. 4, data structure 400 may include a variety of information associated with performance monitoring for root node 110. For example, data structure 400 may include a node ID field 410, a frame delay field 420, a frame delay variation field 430, a frame loss field 440, and a variety of records or entries 450 associated with fields 410-440.

Node ID field 410 may include an IP address, a media access control (MAC) address, a serial number, or another unique identifier for leaf nodes (e.g., leaf nodes 120) and a root point (e.g., root point 140) associated with root node 110. Frame delay field 420 may include a frame delay value (e.g., the time required to transmit a packet from a source to a destination across a ME network, such as provider network 130) expressed, for example in milliseconds. Frame delay variation field 430 may include a frame delay variation value (e.g., a measure of the variation in the delays experienced by different packets belonging to the same class of service (CoS) instance). Frame loss field 440 may include a frame loss ratio (e.g., a number of lost packets during a time interval, T, versus the number of ingress packets that should be successfully delivered during the time interval T), expressed, for example, as a percentage.

As shown in FIG. 4, a particular entry 450 (e.g., "Leaf #1") in node ID field 410 may be associated with an entry (e.g., "200" msec) in frame delay field 420, another entry (e.g., "7.5%") in frame delay variation field 430, and still another entry (e.g., 0.2%) in frame loss field 440. Entries 450 may be calculated for each leaf node 120 and root point 140 based on data extracted from responding PM packets of each leaf node 120 and root point 140. Thus, data structure 400 may provide separate performance measurements for each leaf node 120 and root point 140 associated with root point 110 in an E-Tree service.

Although FIG. 4 shows exemplary information that may be provided in data structure 400, in other implementations, data structure 400 may contain less, different, differently-arranged, or additional information than depicted in FIG. 4.

Figure 5:
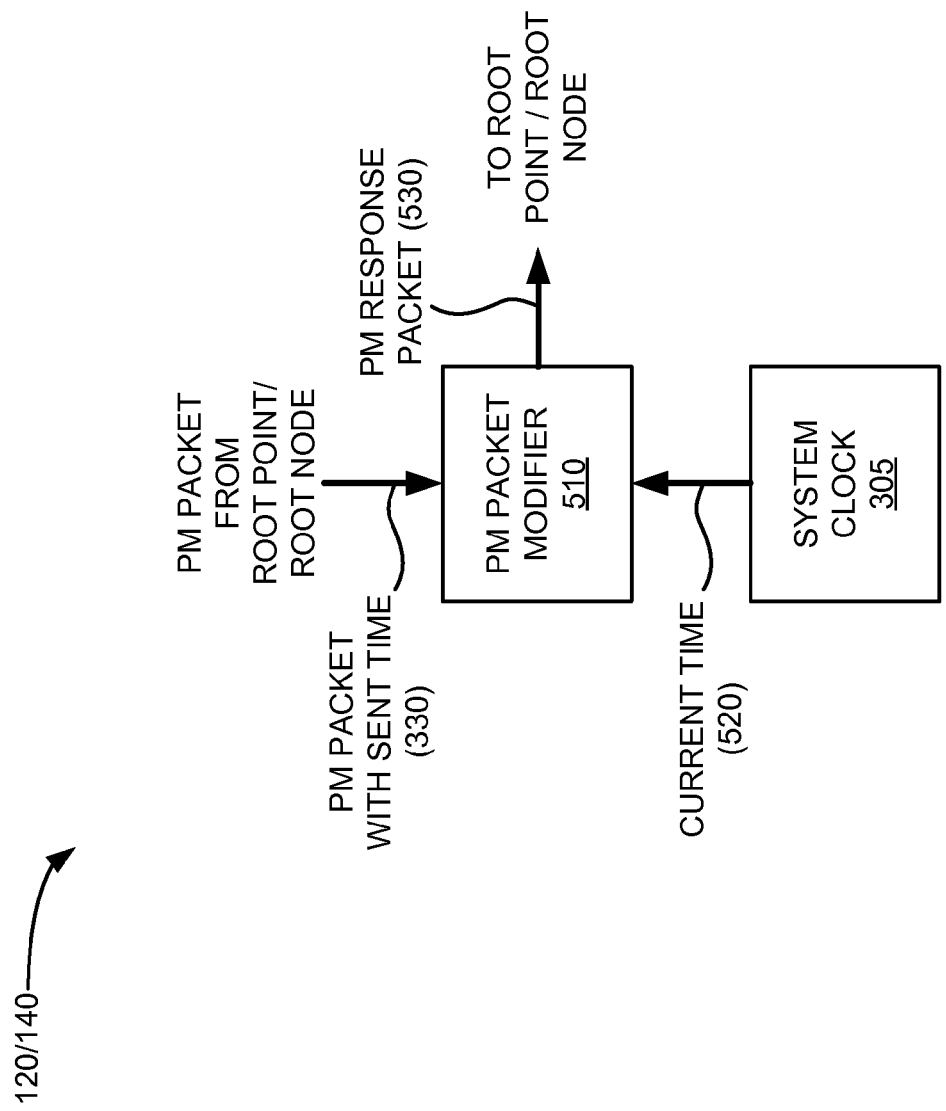
FIG. 5 is a diagram of exemplary functional components of a leaf node depicted in FIG. 1.

FIG. 5 is a diagram of exemplary functional components of leaf node 120 and root point 140. In one implementation, the functions described in connection with FIG. 5 may be performed by one or more components of device 200 (FIG. 2). As shown in FIG. 5, leaf node 120 and/or root point 140 may include system clock 305 and a performance monitoring (PM) packet modifier 510. System clock 305 may include may include the features described above in connection with, for example, FIG. 3.

PM packet modifier 510 may include hardware or a combination of hardware and software that may receive a PM packet originating from a root node and generate a PM response packet. For example, PM packet modifier 510 may receive PM packet 330, originating from root node 110, via root point 140. PM packet modifier 510 may identify a received time (e.g., based on a current time 520 received from system clock 305). PM packet modifier 510 may modify PM packet 330 to create a PM response packet 530 that includes the leaf node ID for the particular leaf node 120 (or the node ID for the root point 140), a receive time stamp, and a send time stamp (e.g., also based on current time 520 received from system clock 305). In one implementation, the structure of PM response packet 530 (e.g., the data portion, excluding layer 2 encapsulation) may be as follows:

[Root node ID] [TsX] [Leaf node ID or node ID of Root point] [RrX] [TrX], where "Root node ID" may be a unique identifier (e.g., an IP address, an alphanumeric identifier, or another identifier) for root node 110, where "TsX" may be a sent time for PM packet 330, "RrX" may be a receive time of PM packet 330 at leaf node 120/root point 140, and "TrX" may be a sent time for PM response packet 530. PM response packet 530 may be sent to root point 140 and, subsequently, to root node 110. PM response packet 530 can be inserted into, or combined with, the payload portion of any performance monitoring protocol. In one implementation, additional information, such as a packet sequence number (or other data), may be included in PM response packet 530 to allow for detailed packet loss measurements.

Although FIG. 5 shows exemplary functional components of leaf node 120 and root point 140, in other implementations, leaf node 120 and/or root point 140 may contain fewer, different, differently arranged, or additional functional components than depicted in FIG. 5. For example, root point 140 may include functional components for routing packets to/from root node 110 and leaf nodes 120. As another example, functional components described in connection with FIG. 3 above may be incorporated together with the functional components described in connection with FIG. 5. Additionally, or alternatively, one or more functional components of leaf node 120 and/or root point 140 may perform one or more other tasks described as being performed by one or more other functional components of leaf node 120 and/or root point 140.

FIG. 6 provides a flow chart of an exemplary process 600 for monitoring performance of E-Tree services over a metro Ethernet network according to implementations described herein. In one implementation, some or all of process 600 may be performed by one or more devices associated with a metro Ethernet network (e.g., provider network 130), such as root node 110, leaf nodes 120, and/or root point 140. In other implementations, some or all of process 600 may be performed by another device or group of devices associated with a metro Ethernet network.

Process 600 may include identifying leaf nodes and a root point for performance monitoring of an E-Tree service (block 610), preparing and sending a PM packet to the root point (block 620), and sending, by the root point, the PM packet to the leaf nodes (block 630). For example, as described above in connection with FIG. 3, PM packet generator 310 may identify a particular E-Tree service to monitor and generate PM packet 330 to send to root point 140 (and, subsequently, each leaf node 120). PM packet 330 may include a unique identifier for root node 110 and sent time (e.g., based on current time 325 received from system clock 305). PM packet 330 can be inserted into, or combined with, the payload portion of any performance monitoring protocol.

Returning to FIG. 6, each leaf node may add time stamps and send a PM response packet to the root node (block 640), and the root point may add time stamps and send a PM response packet to the root node (block 650). For example, as described above in connection with FIG. 5, PM packet modifier 510 may receive PM packet 330, originating from root node 110, via root point 140. PM packet modifier 510 may identify a received time (e.g., based on current time 520 received from system clock 305). PM packet modifier 510 may modify PM packet 330 to create PM response packet 530 that includes the leaf node ID for the particular leaf node 120 (or the node ID for the root point 140), a receive time stamp, and a send time stamp (e.g., also based on current time 520 received from system clock 305). PM response packet 530 may be sent to root point 140 and, subsequently, to root node 110. PM response packet 530 can be inserted into, or combined with, the payload portion of any performance monitoring protocol. In one implementation, additional information, such as a packet sequence number (or other data), may be included in PM response packet 530 to allow for detailed packet loss measurements.

Referring back to FIG. 6, the root node may receive and log the PM response packets (block 660), and performance statistics may be derived for a data structure (block 670). For example, as described above in connection with FIG. 3, data logger 315 may receive one or more PM response packets 335 (e.g., responses to PM packet 330) from each of leaf nodes 120 (e.g., via root point 140) and one or more responding packets from root point 140. Data logger 315 may extract time stamp information and node identifiers from each packet, apply a received time (e.g., based on current time 340 received from system clock 305), and process the time information and node identifiers to derive PM statistics 345 associated with the root node (e.g., root node 110). Thus, PM response packets 335 may allow for derivation of PM statistics for each root node-to-leaf node path. The derived statistics may include, but are not limited to: one-way or two-way frame delay, two-way frame loss, and one-way or two-way frame delay variation. The same statistic may also be derived for the path from the root node 110 to the node with the location of root point 140. PM data table 320 may receive, from data logger 315, PM statistics 345 for each leaf node 120 and root point 140 associated with root node 110. Alternatively, or additionally, PM data table 320 may include raw data that data logger 315 extracts from PM response packets 335, such as time stamp data and packet sequence numbers associated with each leaf node and/or root point 140.

Implementations described herein may provide systems and/or methods that may allow for performance monitoring of individual paths in an E-Tree service. In one implementation, a root node associated with the E-Tree service may send, over a rooted-multipoint EVC, a performance monitoring packet, where the performance monitoring packet may include a unique identifier for the root node and a time sent by the root node. The root node may receive, from one of multiple leaf nodes associated with the E-Tree service, a performance monitoring response packet, where the performance monitoring response packet includes a unique identifier for the one of the multiple leaf nodes and a time received by the one of the multiple leaf nodes. The root node may extract, from the performance monitoring response packet, data including the unique identifier for the one of the multiple leaf nodes and the time received by the one of the multiple leaf nodes, and may store performance measurements based on the extracted data, where the performance measurements are associated with the one of the multiple leaf nodes.

Additionally, the root node may receive, from a root point associated with the E-Tree service, another performance monitoring response packet, where the other performance monitoring response packet includes a unique identifier for the root point and a time received by the root point. The root node may extract, from the other performance monitoring response packet, data including the unique identifier of the root node and the time received by the root node, and may store performance measurements based on the extracted data, where the performance measurements are associated with the root node.

The foregoing description provides illustration and description, but is not intended to be exhaustive or to limit the implementations to the precise form disclosed. Modifications and variations are possible in light of the above teachings or may be acquired from practice of systems and/or methods disclosed herein.

For example, while a series of blocks has been described with regard to the flowchart of FIG. 6, the order of the blocks may differ in other implementations. Further, non-dependent blocks may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method performed by one or more devices in a metro Ethernet network, the method comprising:
    sending, by a root node associated with an Ethernet-Tree (E-Tree) service and over a rooted-multipoint Ethernet virtual connection (EVC), a performance monitoring packet, where the performance monitoring packet includes a unique identifier for the root node and a time sent by the root node;
    receiving, by the root node and from one of a plurality of leaf nodes associated with the E-Tree service, a performance monitoring response packet, where the performance monitoring response packet includes a unique identifier for the one of the plurality of leaf nodes and a time received by the one of the plurality of leaf nodes;
    extracting, by the root node and from the performance monitoring response packet, the unique identifier for the one of the plurality of leaf nodes and the time received by the one of the plurality of leaf nodes; and
    storing, by the root node, performance measurements based on the extracted data, where the performance measurements are associated with the one of the plurality of leaf nodes.

2. The method of claim 1, further comprising:
    receiving, by the root node and from a root point associated with the E-Tree service, another performance monitoring response packet, where the other performance monitoring response packet includes a unique identifier for the root point and a time received by the root point.

3. The method of claim 1, where the performance measurements are stored in a data structure that includes performance measurements of each of the plurality of leaf nodes associated with the E-Tree service.

4. The method of claim 1, further comprising:
    deriving, by the root node, the performance measurements from the extracted data.

5. The method of claim 4, where the performance measurements include one or more of:
    frame delay (FD) associated with a point-to-point path to each of the plurality of leaf nodes,
    frame loss (FL) associated with a point-to-point path to each of the plurality of leaf nodes, or
    frame delay variation (FDV) associated with a point-to-point path to each of the plurality of leaf nodes.

6. The method of claim 1, where the performance monitoring response packet further includes a time sent by the one of the plurality of leaf nodes.

7. The method of claim 1, where the performance monitoring response packet further includes the unique identifier for the root node and the time sent by the root node.

8. The method of claim 1, where the unique identifier for the root node and the unique identifier for the one of the plurality of leaf nodes are separate from a layer 2 header of the performance monitoring packet.

9. The method of claim 1, where the performance monitoring packet is included within a payload of another performance monitoring protocol.

10. A device, comprising:
    a performance monitoring packet generator to send, to a root point for a rooted-multipoint Ethernet virtual connection (EVC), a performance monitoring packet, where the performance monitoring packet includes a unique identifier for the device and a time sent by the device; and
    a data logger to:
        receive, from the root point, performance monitoring response packets generated by a plurality of leaf nodes associated with the rooted-multipoint EVC, where each of the performance monitoring response packets includes a format that permits identification of an originating one of the plurality of leaf nodes, and
        store performance measurements based on the received performance monitoring response packets, where the performance measurements are stored in a data structure so that associates a particular performance measurement with one of the originating ones of the plurality of leaf nodes.

11. The device of claim 10, where the data logger is further to:
    extract, from the performance monitoring response packets, data including a unique identifier for an originating leaf node of the plurality of leaf nodes, a time received stamp, and a time sent stamp, and
    derive the performance measurements from the extracted data.

12. The device of claim 11, where the performance measurements include on or more of:
- frame delay (FD) associated with a point-to-point path to each of the plurality of leaf nodes,
- frame loss (FL) associated with a point-to-point path to each of the plurality of leaf nodes, or
- frame delay variation (FDV) associated with a point-to-point path to each of the plurality of leaf nodes.

13. The device of claim 10, where the data logger is further to:
- receive, from the root point, another performance monitoring response packet, generated by the root point, where the other performance monitoring response packet includes a format that permits the identification of the root point as the originator of the other performance monitoring response packet, and
- store another performance measurement based on the received other performance monitoring response packet, where the other performance measurement is stored in a data structure that associates the other performance measurement with the root point.

14. The device of claim 10, where each of the performance monitoring response packets further includes a time when the performance monitoring packet was received at a respective one of the plurality of leaf nodes and a time when the performance monitoring response packet was sent by the respective one of the plurality of leaf nodes.

15. The device of claim 10, where each of the performance monitoring response packets further includes the unique identifier of the device and a time sent by the device.

16. The device of claim 10, where the device is a root node.

17. The system of claim 10, where the device is one of:
- a switch,
- a router,
- a gateway,
- a network interface card (NIC),
- a hub,
- a bridge, or
- a proxy server.

18. A performance monitoring system for an Ethernet-Tree (E-Tree) service, comprising:
- means for sending, over a rooted-multipoint Ethernet virtual connection (EVC), a performance monitoring packet, where the performance monitoring packet includes a unique identifier for a root node and a time sent by the root node;
- means for receiving, from a plurality of leaf nodes associated with the E-Tree service, performance monitoring response packets, where each of the performance monitoring response packets include a unique identifier of an originating leaf node of the plurality of leaf nodes;
- means for receiving, from a root point associated with the E-Tree service, another performance monitoring response packet, where the other performance monitoring response packet includes a unique identifier for the root point;
- means for extracting, from the performance monitoring response packets and the other performance monitoring response packet, data including the unique identifiers for the originating leaf nodes of the plurality of leaf nodes and the unique identifier for the root point; and
- means for storing performance measurements based on the extracted data, where the performance measurements are associated with the originating leaf nodes of the plurality of leaf nodes or the root point.

19. The system of claim 18, comprising:
- means for including the performance monitoring packet and the performance monitoring response packets within a payload of another performance monitoring protocol.

20. The system of claim 18, further comprising:
- means for deriving the performance measurements from the extracted data.

* * * * *